United States Patent
Chen et al.

(10) Patent No.: US 11,506,960 B2
(45) Date of Patent: Nov. 22, 2022

(54) ACTUATOR, OPERATION METHOD THEREOF, AND PROJECTOR

(71) Applicant: Coretronic Corporation, Hsin-Chu (TW)

(72) Inventors: Wei-Hao Chen, Hsin-Chu (TW); Ken-Teng Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/488,214

(22) Filed: Sep. 28, 2021

(65) Prior Publication Data
US 2022/0137493 A1    May 5, 2022

(30) Foreign Application Priority Data

Oct. 29, 2020   (CN) .......................... 202011179278.1

(51) Int. Cl.
*G03B 21/14*     (2006.01)
*H02K 41/035*   (2006.01)

(52) U.S. Cl.
CPC ......... *G03B 21/142* (2013.01); *G03B 21/145* (2013.01); *H02K 41/0354* (2013.01)

(58) Field of Classification Search
CPC ..... G03B 21/14; G03B 21/142; G03B 21/145
See application file for complete search history.

(56) References Cited

U.S. PATENT DOCUMENTS

| 10,670,948 | B2* | 6/2020 | Chao | G02B 26/085 |
| 2018/0210191 | A1* | 7/2018 | Lo | G03B 5/06 |
| 2020/0225437 | A1* | 7/2020 | Chao | G02B 26/0875 |
| 2021/0096449 | A1* | 4/2021 | Hirakura | H01F 7/14 |
| 2022/0252828 | A1* | 8/2022 | Chen | G02B 26/0875 |

FOREIGN PATENT DOCUMENTS

| CN | 110068906 | 7/2019 |
| TW | 201939086 | 10/2019 |

* cited by examiner

*Primary Examiner* — William C. Dowling
(74) *Attorney, Agent, or Firm* — JCIPRNET (57) ABSTRACT

An actuator including a frame body, a base, a first drive assembly, a second drive assembly, and an optical element is provided. The frame body includes the first frame portion and the second frame portion. The base surrounds the frame body. The first drive assembly is disposed between the base and the first frame portion. The second drive assembly is disposed between the base and the second frame portion. When the actuator is set to a first mode, a phase difference between the first drive assembly and the second drive assembly is substantially 0 degrees, and the optical element exhibits a first actuation mode relative to the base. Alternatively, when the actuator is set to the second mode, the phase difference between the first drive assembly and the second drive assembly is substantially 90 degrees, and the optical element exhibits a second actuation mode relative to the base.

12 Claims, 7 Drawing Sheets

ACTUATOR, OPERATION METHOD THEREOF, AND PROJECTOR

CROSS-REFERENCE TO RELATED APPLICATION

This application claims the priority benefit of China application serial no. 202011179278.1, filed on Oct. 29, 2020. The entirety of the above-mentioned patent application is hereby incorporated by reference herein and made a part of this specification.

BACKGROUND

Technical Field

The disclosure relates to an actuator, an operation method thereof, and a projector; in particular the disclosure relates to an actuator that adjusts a deflection angle of an optical element, an operation method thereof, and a projector.

Description of Related Art

Projectors in general are provided with actuators, and image light beams pass through glasses on the actuators. During the operation of drive elements of the actuator, an axial portion of a frame body is twisted, which causes the glass supported by the frame body to generate quick deflection back and forth, and the image light beam is refracted to another position through the glass, thereby achieving an increase in the resolution of the image projected by the projector. The common unidirectional (i.e., two-way) actuator is usually designed with one axis, and the light path trajectory exhibits a diagonal movement. The bidirectional (i.e., four-way) actuator is usually designed with two axes, and the light path trajectory exhibits a quadrangular movement. In designing the actuator, only one can be selected for the design. After completion, the design of the actuator structure cannot be changed. If a change in design is intended, it is required to be redesigned. That is to say, in the existing actuator structure, the unidirectional (i.e., two-way) design and the bidirectional (i.e., four-way) design cannot both exist or be used at the same time, and also cannot be switched by the users on their own.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an actuator that switches between different actuation modes (i.e., a first mode (e.g., two-way) or a second mode (e.g., four-way)), which saves development costs and production line changeover costs.

The disclosure provides a control method for an actuator, which is configured to control the above-mentioned actuator.

The disclosure provides a projector, in which the above-mentioned actuator is included, and resolution of a projection picture and image sharpness can be changed.

Other objectives and advantages of the disclosure can be further understood from the technical features disclosed herein.

In order to achieve one, some, or all of the above objectives or other objectives, an embodiment of the disclosure proposes an actuator, which includes a frame body, a base, a first drive assembly, a second drive assembly, and an optical element. The frame body includes a first frame portion and a second frame portion. The base surrounds the frame body. The first drive assembly is disposed between the base and the first frame portion. The first frame portion oscillates relative to the base through the first drive assembly. The second drive assembly is disposed between the base and the second frame portion. The second frame portion oscillates relative to the base through the second drive assembly. The optical element is disposed on the frame body and is located in the second frame portion. When actuator is set to a first mode, a phase difference between the first drive assembly and the second drive assembly is substantially 0 degrees, and the frame body takes a diagonal of the optical element as a rotation axis, so that the optical element exhibits a first actuation mode relative to the base. Alternatively, when the actuator is set to a second mode, the phase difference between the first drive assembly and the second drive assembly is substantially 90 degrees, and the frame body takes two center lines of the optical element as rotation axes, so that the optical element exhibits a second actuation mode relative to the base.

In order to achieve one, some, or all of the above objectives or other objectives, an embodiment of the disclosure proposes a control method of an actuator, which includes the following steps. A first mode signal or a second mode signal is received by a user interface. When the user interface receives the first mode signal, a phase difference between adjacent two of a plurality of drive assemblies of the actuator is controlled by a control circuit to be substantially 0 degrees, so that an optical element exhibits a first actuation mode. Alternatively, when the user interface receives the second mode signal, the phase difference between adjacent two of the plurality of drive assemblies of the actuator is controlled by the control circuit to be substantially 90 degrees, so that the optical element exhibits a second actuation mode.

In order to achieve one, some, or all of the above objectives or other objectives, an embodiment of the disclosure proposes a projector, which includes an illumination system, a light valve, a projection lens, and an actuator. The illumination system is configured to provide an illumination light beam. The light valve is configured to convert the illumination light beam into an image light beam. The projection lens is configured to project the image light beam out of the projector. The actuator is disposed between the light valve and the projection lens. The actuator includes a frame body, a base, a first drive assembly, a second drive assembly, and an optical element. The frame body includes a first frame portion and a second frame portion. The base surrounds the frame body. The first drive assembly is disposed between the base and the first frame portion. The first frame portion oscillates relative to the base through the first drive assembly. The second drive assembly is disposed between the base and the second frame portion. The second frame portion oscillates relative to the base through the second drive assembly. The optical element is disposed on the frame body and is located in the second frame portion. When actuator is set to a first mode, a phase difference between the first drive assembly and the second drive assembly is substantially 0 degrees, and the frame body takes a diagonal of the optical element as a rotation axis, so that the optical element exhibits a first actuation mode relative to the base. Alternatively, when the actuator is set to a second mode, the phase difference between the first drive assembly and the second drive assembly is substantially 90 degrees, and the frame body takes two center lines of the optical element as rotation axes, such that the optical element exhibits a second actuation mode relative to the base.

Based on the foregoing, the embodiment of the disclosure has at least one of the following advantages or effects. In the design of the actuator of the disclosure, the actuation mode of the optical element relative to the base may be changed through the phase difference between the first drive assembly and the second drive assembly. That is to say, the actuator of the disclosure may switch between different actuation modes through the phase difference between the drive assemblies, thereby saving the development cost and the production line changeover cost of the actuator. Besides, in the projector adopting the actuator of the disclosure, the resolution of the projection picture and the image sharpness can be changed. Therefore, the user may select the required actuation mode depending on the requirements for the display picture (e.g., sharpness, resolution, or the like.) to achieve the required display resolution of the projection picture.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive. Throughout the specification and the appended claims, the term "substantially" as used is inclusive of a particular value and means within an acceptable range of deviation from the particular value as determined by people having ordinary skill in the art, considering the influence on the display of a screen and an error associated with measurement. For instance, the range may include an error of ±3 degrees and may be acceptable without obvious influence on the display of a screen.

Figure 1:
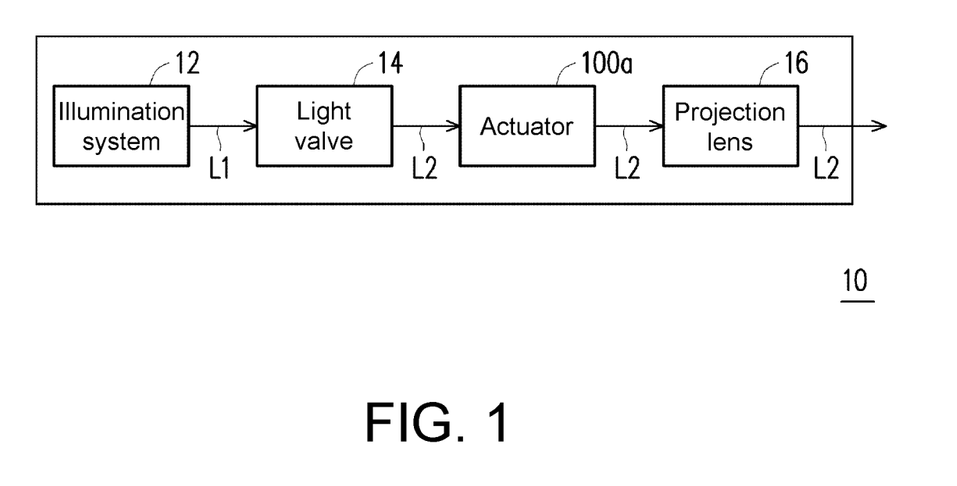
FIG. 1 is a schematic diagram of a projector according to an embodiment of the disclosure.

FIG. 1 is a schematic diagram of a projector according to an embodiment of the disclosure. With reference to FIG. 1, in this embodiment, a projector 10 includes an illumination system 12, a light valve 14, a projection lens 16, and an actuator 100a. The illumination system 12 is configured to provide an illumination light beam L1. The illumination system 12 also includes a light source such as a bulb, a light emitting diode (LED), or a laser light source. The light valve 14 is configured to convert the illumination light beam L1 into an image light beam L2. The light valve 14 is, for example, a reflective or transmissive spatial light modulator. The reflective spatial light modulator includes, for example, reflective liquid crystal on silicon (LCOS) or digital micromirror device (DMD), or the like. The transmissive spatial light modulator includes, for example, a transparent liquid crystal panel. The projection lens 16 is configured to project the image light beam L2 out of the projector 10 and display it on a screen or the wall (not shown). The projection lens 16 includes, for example, one or a combination of multiple optical lenses having refractive power, such as various combinations of non-planar lenses including biconcave lenses, biconvex lenses, concave-convex lenses, convex-concave lenses, plano-convex lenses, and plano-concave lenses. In an embodiment, the projection lens 16 may also include a planar optical lens. The form or the type of the projection lens 16 is not limited in this disclosure. The actuator 100a is disposed between the light valve 14 and the projection lens 16.

Figure 2A:
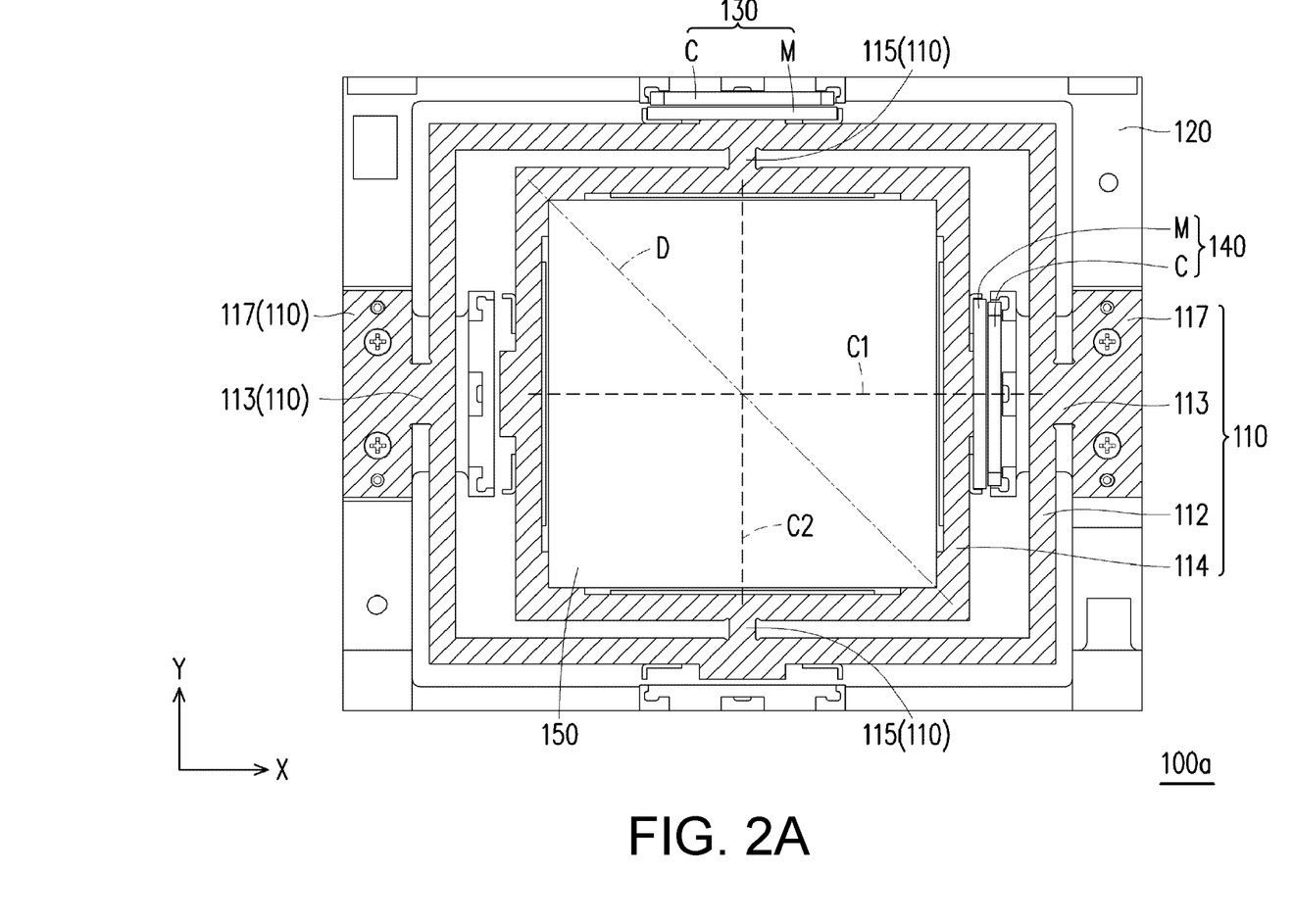
FIG. 2A is a schematic front view of the actuator of FIG. 1 viewed from an image light beam receiving direction.
Figure 2B:
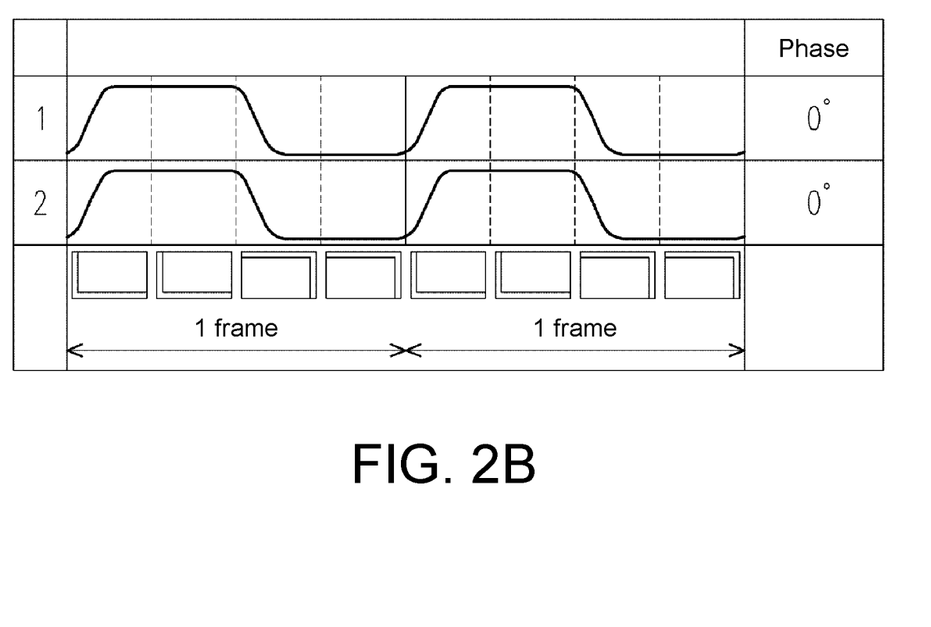
FIG. 2B and FIG. 2C are, when the actuator of FIG. 2A is in a first mode, respectively a schematic diagram showing a phase of a drive assembly and an image frame and a schematic diagram showing a light path trajectory.
Figure 2C:
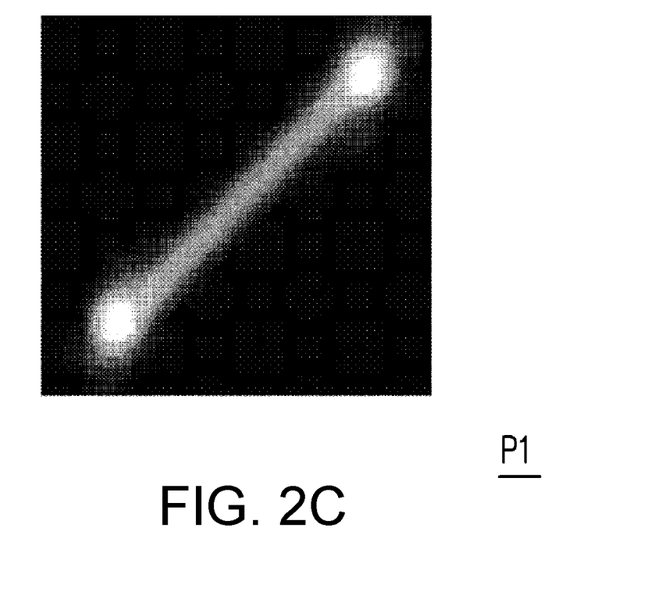
Figure 2D:
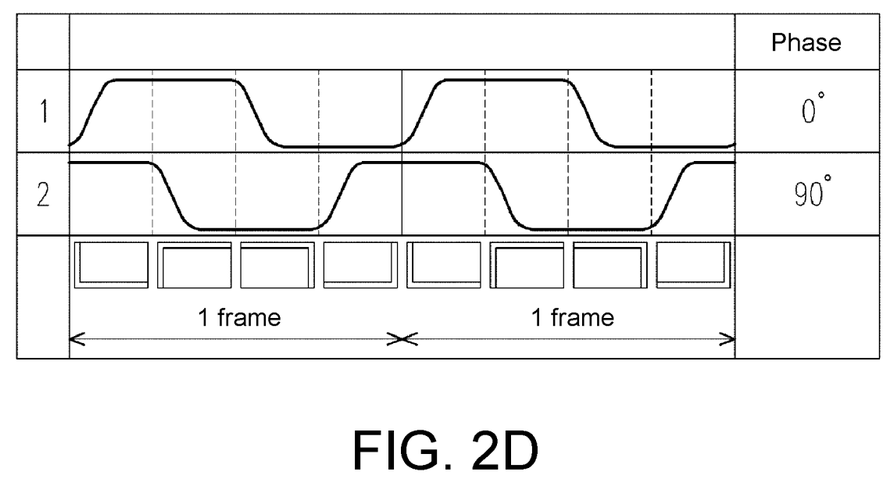
FIG. 2D and FIG. 2E are, when the actuator of FIG. 2A is in a second mode, respectively a schematic diagram showing the phase of the drive assembly and the image frame and a schematic diagram showing the light path trajectory.
Figure 2E:
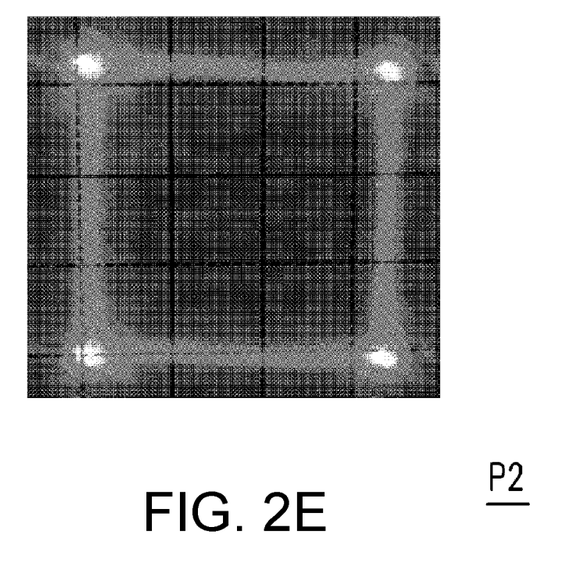

FIG. 2A is a schematic front view of the actuator of FIG. 1 viewed from an image light beam receiving direction. FIG. 2B and FIG. 2C are, when the actuator of FIG. 2A is in a first mode, respectively a schematic diagram showing a phase of a drive assembly and an image frame and a schematic diagram showing a light path trajectory. FIG. 2D and FIG. 2E are, when the actuator of FIG. 2A is in a second mode, respectively a schematic diagram showing the phase of the drive assembly and the image frame and a schematic diagram showing the light path trajectory.

With reference to FIG. 2A first, in this embodiment, the actuator 100a includes a frame body 110, a base 120, a first drive assembly 130, a second drive assembly 140, and an optical element 150. The frame body 110 includes a first frame portion 112 and a second frame portion 114. The base 120 surrounds the frame body 110. The first drive assembly 130 is disposed between the base 120 and the first frame portion 112, and the first frame portion 112 is driven by the first drive assembly 130 to oscillate relative to the base 120. The second drive assembly 140 is disposed between the base 120 and the second frame portion 114, and the second frame portion 114 is driven by the second drive assembly 140 to oscillate relative to the base 120. The optical element 150 is disposed on the frame body 110 and located in the second frame portion 114.

To be specific, the frame body 110 of this embodiment also includes at least one first axial portion (schematically showing two first axial portions 113), at least one second axial portion (schematically showing two second axial portions 115), and at least one fixing portion (schematically showing two fixing portions 117). The fixing portion 117 is fixed on the base 120, the first frame portion 112 is connected to the fixing portion 117 through the first axial portion 113, and the second frame portion 114 is connected to the first frame portion 112 through the second axial portion 115. Preferably, the first frame portion 112, the second frame portion 114, the first axial portion 113, the second axial portion 115, and the fixing portion 117 are, for example, integrally formed, and the frame body 110 includes, for example, metal. Herein, an extension direction of the first axial portion 113 is perpendicular to an extension direction of the second axial portion 115. Therefore, the actuator 100a may be regarded as a biaxial actuator.

Moreover, the actuator 100a of this embodiment has one drive assembly in each axial direction, namely a second drive assembly 140 in the X axial direction and a first drive assembly 130 in the Y axial direction. The first drive assembly 130 and the second drive assembly 140 may be controlled independently. The first drive assembly 130 and the second drive assembly 140 are, for example, voice coil motors or piezoelectric materials. For example, the first drive assembly 130 and the second drive assembly 140 are each a voice coil motor, and the voice coil motor includes a coil C and a magnet M. One of the coil C and the magnet M is fixed on the frame body 110, and the other of the coil C and the magnet M is fixed on the base 120. Herein, the coil C is fixed on the base 120, and the magnet is fixed on the frame body 110. By providing the coil C with an alternating current (AC) signal, the coil C and the magnet M move relative to each other to drive the first axial portion 113 and the second axial portion 115 to be deformed and twisted, and accordingly drive the optical element 150 to vibrate or oscillate relative to the base 120. In other embodiments not shown, the driving element may also be a piezoelectric material. Through applying a voltage to the piezoelectric material, the piezoelectric material deforms and thereby drives the optical element 150 to vibrate or oscillate relative to the base 120.

With reference to FIG. 2A, FIG. 2B, and FIG. 2C at the same time, when the actuator 100a is set to a first mode P1, a phase difference between the first drive assembly 130 and the second drive assembly 140 is substantially 0 degrees, and the frame body 110 takes a diagonal D of the optical element 150 as a rotation axis, so that the optical element 150 exhibits a first actuation mode relative to the base 120. Herein, the first actuation mode is specifically a diagonal oscillation, and a pixel movement trajectory is exhibited as a diagonal movement (i.e., a $\sqrt{2}/2$ diagonal movement of the pixel). In other words, when the actuator 100a is deflected in one direction (i.e., two-way), the phase difference between the first drive assembly 130 and the second drive assembly 140 in different axial directions is substantially 0 degrees.

With reference to FIG. 2A, FIG. 2D, and FIG. 2E at the same time, when the actuator 100a is set to a second mode P2, the phase difference between the first drive assembly 130 and the second drive assembly 140 is substantially 90 degrees, and the frame body 110 takes two center lines C1 and C2 of the optical element 150 as rotation axes, so that the optical element 150 exhibits a second actuation mode relative to the base 120. Herein, the second actuation mode is specifically an orthogonal oscillation, and the pixel movement trajectory is exhibited as a quadrangular movement (i.e., a ½ orthogonal movement of the pixel). In other words, when the actuator 100a is deflected in two directions (e.g., four-way), the phase difference between the first drive assembly 130 and the second drive assembly 140 in different axial directions is substantially 90 degrees.

Briefly speaking, by controlling the phase difference between the first drive assembly 130 and the second drive assembly 140 in different axial directions, the actuation mode of the optical element 150 relative to the base 120 may be changed and switched between a two-way or four-way vibration or oscillation, and thereby the trajectory of the light beam passing through the optical element 150 is changed. That is to say, the actuator 100a of this embodiment may switch between different actuation modes through the phase difference between drive assemblies, accordingly saving the development cost and the production line changeover cost of the actuator. Besides, in the projector 10 adopting the actuator 100a of the embodiment, the resolution of the projection picture and the image sharpness may be changed. Therefore, the user may select the required actuation mode depending on the requirements for the display picture (e.g., sharpness, resolution, or the like.) to achieve the required display resolution of the projection picture.

It should be noted herein that the reference numerals and part of the content of the above embodiment remain to be used in the following embodiments, the same or similar reference numerals are adopted to represent the same or similar elements, and the description of the same technical content is omitted. Reference may be made to the above embodiment for the description of the omitted part, which will not be repeated in the following embodiments.

Figure 3A:
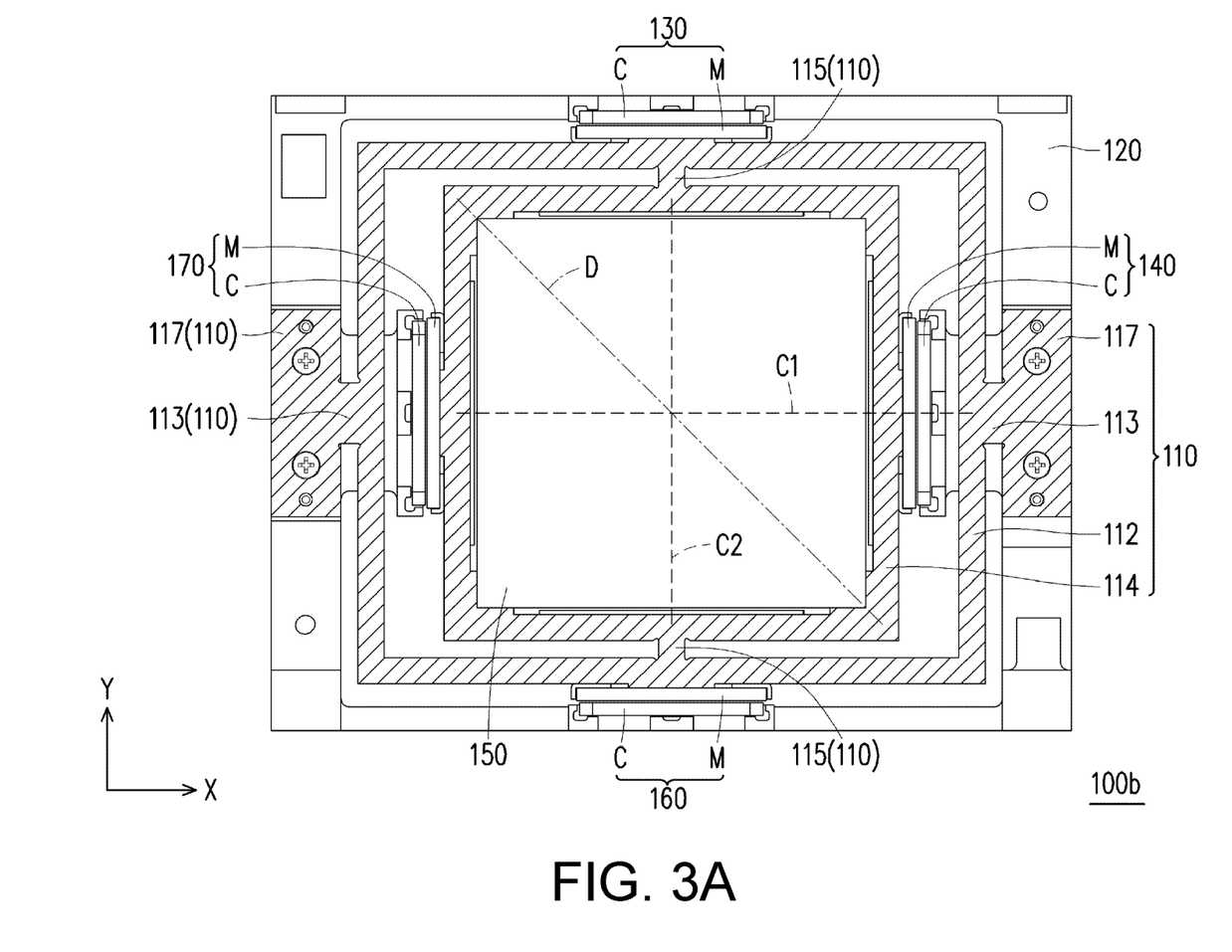
FIG. 3A is a schematic front view of an actuator according to another embodiment of the disclosure from the image light beam receiving direction.
Figure 3B:
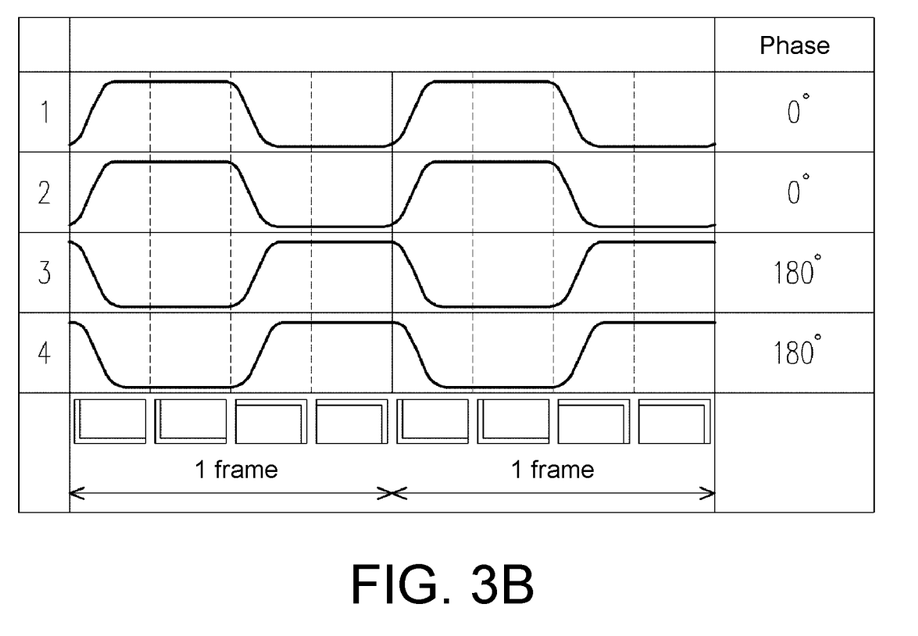
FIG. 3B is a schematic diagram of the phase of the drive assembly and the image frame when the actuator of FIG. 3A is in the first mode.
Figure 3C:
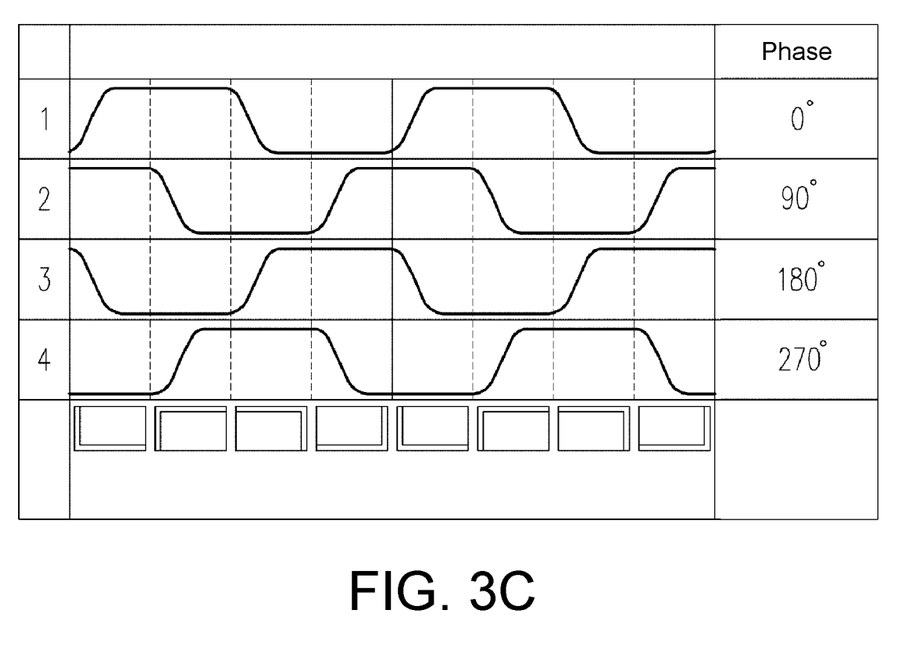
FIG. 3C is a schematic diagram of the phase of the drive assembly and the image frame when the actuator of FIG. 3A is in the second mode.

FIG. 3A is a schematic front view of an actuator according to another embodiment of the disclosure from the image light beam receiving direction. FIG. 3B is a schematic diagram of the phase of the drive assembly and the image frame when the actuator of FIG. 3A is in the first mode. FIG. 3C is a schematic diagram of the phase of the drive assembly and the image frame when the actuator of FIG. 3A is in the second mode. With reference to FIG. 2A and FIG. 3A at the same time, an actuator 100b of this embodiment is similar to the actuator 100a of FIG. 2A. The difference between the two is that the actuator 100b of this embodiment further includes a third drive assembly 160 and a fourth drive assembly 170. The third drive assembly 160 is disposed corresponding to the first drive assembly 130 and is disposed between the base 120 and the first frame portion 112. The first frame portion 112 oscillates relative to the base 120 through the first drive assembly 130 and the third drive assembly 160. The fourth drive assembly 170 is disposed corresponding to the second drive assembly 140 and is disposed between the base 120 and the second frame portion 114. The second frame portion 114 oscillates relative to the base 120 through the second drive assembly 140 and the fourth drive assembly 170. That is to say, four drive assemblies are included in the X axial direction and the Y axial direction, namely two drive assemblies in axial direction. That is, the first drive assembly 130 and the third drive assembly 160 are on the Y axis, and the second drive assembly 140 and the fourth drive assembly 170 are on the X axis. Preferably, a phase difference between the first drive assembly 130 and the third drive assembly 160 is substantially 180 degrees, and a phase difference between the second drive assembly 140 and the fourth drive assembly 170 is substantially 180 degrees.

With reference to FIG. 3A and FIG. 3B at the same time, when a phase difference between the third drive assembly 160 and the fourth drive assembly 170 is substantially 0 degrees, and a phase difference between the first drive assembly 130 and the fourth drive assembly 170 is substantially 180 degrees, the frame body 110 takes the diagonal D of the optical element 150 as the rotation axis, so that the optical element 150 exhibits a first actuation mode relative to the base 120. Herein, the first actuation mode is specifically a diagonal oscillation. In other words, when the actuator 100b exhibits a two-way deflection, the phase differences between adjacent drive assemblies in different axial directions are substantially 0 degrees and 180 degrees.

With reference to FIG. 3A and FIG. 3C at the same time, when the phase difference between the third drive assembly 160 and the fourth drive assembly 170 is substantially 90 degrees, and the phase difference between the first drive assembly 130 and the fourth drive assembly 170 is substantially 270 degrees, the frame body 110 the two center lines C1 and C2 of the optical element 150 as the rotation axes, so that the optical element 150 exhibits a second actuation mode relative to the base 120. Herein, the second actuation mode is specifically an orthogonal oscillation. In other words, when the actuator 100b exhibits a four-way deflection, the phase difference between adjacent drive assemblies in different axial directions is substantially 90 degrees and 270 degrees. Briefly speaking, regardless of a two-way or four-way deflection, the phase difference between two driving assemblies in the same axial direction is substantially 180 degrees.

Figure 4:
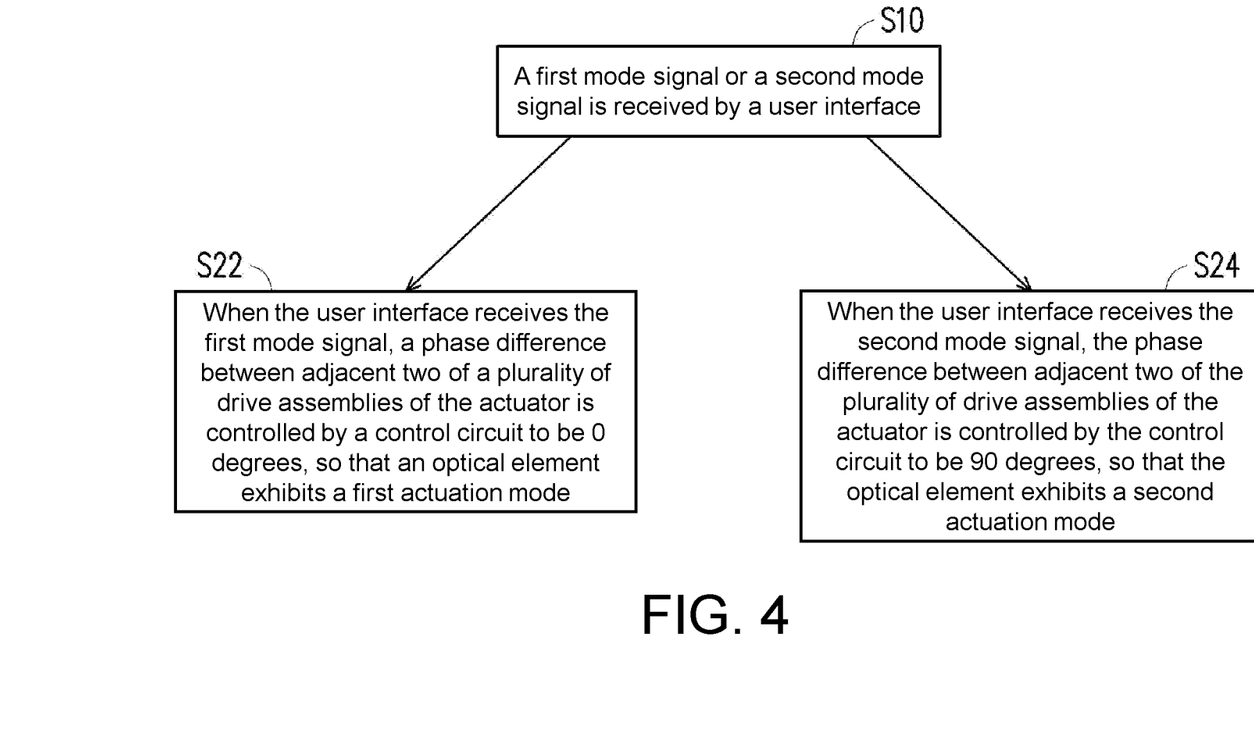
FIG. 4 is a flowchart of a control method of an actuator according to an embodiment of the disclosure.

FIG. 4 is a flowchart of a control method of an actuator according to an embodiment of the disclosure. With reference to FIG. 2A and FIG. 4, firstly, in step S10, a first mode signal or a second mode signal is received by a user interface. If the flow enters step S22, namely when the user interface receives the first mode signal, a phase difference between adjacent two of a plurality of drive assemblies (i.e., the first drive assembly 130 and the second drive assembly 140) of the actuator 100a is controlled by a control circuit to be substantially 0 degrees, so that the optical element 150 exhibits a first actuation mode. If the flow enters step S24, namely when the user interface receives the second mode signal, the phase difference between adjacent two of the drive assemblies (i.e., the first drive assembly 130 and the second drive assembly 140) of the actuator 100a (or the actuator 100b) is controlled by the control circuit to be substantially 90 degrees, so that the optical element 150 exhibits a second actuation mode.

Taking the actuator 100b of FIG. 3A as an example for description, when the user interface receives the first mode signal, the control circuit controls the phase difference between the first drive assembly 130 and the third drive assembly 160 to be substantially 180 degrees, the phase difference between the second drive assembly 140 and the fourth drive assembly 170 to be substantially 180 degrees, the phase difference between the third drive assembly 160 and the fourth drive assembly 170 to be substantially 0 degrees, and the phase difference between the first drive assembly 130 and the fourth drive assembly 170 to be substantially 180 degrees, so that the optical element 150 exhibits the first actuation mode. Alternatively, when the user interface receives the second mode signal, the control circuit controls the phase difference between the third drive assembly 160 and the fourth drive assembly 170 to be substantially 90 degrees, the phase difference between the first drive assembly 130 and the fourth drive assembly 170 to be substantially 270 degrees, so that the optical element 150 exhibits the second actuation mode. Herein, the first actuation mode is a diagonal oscillation, and the second actuation mode is an orthogonal oscillation.

For the user, different resolutions may be selected through the user interface. That is to say, depending on the selection by the user, the actuators 100a and 100b may vibrate in one direction, vibrate in two directions, or not be operated, and have different resolutions. When the user selects that the actuators 100a and 100b vibrate in two directions (i.e., four-way), the resolution of the projection picture is higher since the pixel moves four times in one image frame, referring to FIG. 2D, FIG. 2E, and FIG. 3C at the same time. However, since the time ratio of the image movement is relatively high, the image sharpness is less than the vibration in one direction. When the user selects that the actuators 100a and 100b vibrate in one direction (i.e., two-way), the picture resolution is relatively reduced compared with the vibration in two directions since the pixel moves only twice in one image frame, referring to FIG. 2B, FIG. 2C, and FIG. 3B at the same time. Nonetheless, since the time ratio of the image movement is relatively low, the influence on the image sharpness is smaller than the vibration in the two directions (i.e., four-way). If the actuators 100a and 100b are not operated, namely if the actuators 100a and 100b are not in use, the original DMD resolution is presented without an increase in the resolution, but the image sharpness is the greatest since the pixel is not moving.

Briefly speaking, on the condition that the actuators 100a and 100b have the same structure and can be used together, switching between different actuation modes (two-way and four-way) is achieved simply by different signals for controlling each driving assembly, which saves the development cost and production line changeover cost of the actuators 100a and 100b. The user may select different display resolutions depending on the requirements for the projection picture (e.g., sharpness or resolution).

In summary of the foregoing, the embodiment of the disclosure has at least one of the following advantages or effects. In the design of the actuator of the disclosure, the actuation mode of the optical element relative to the base may be changed through the phase difference between the first drive assembly and the second drive assembly. That is to say, the actuator of the disclosure may switch between different actuation modes through the phase difference between the drive assemblies, thereby saving the development cost and the production line changeover cost of the actuator. Besides, in the projector adopting the actuator of the disclosure, the resolution of the projection picture and the image sharpness can be changed. Therefore, the user may select the required actuation mode depending on the requirements for the display picture (e.g., sharpness, resolution, or the like.) to achieve the required display resolution of the projection picture.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An actuator comprising a frame body, a base, a first drive assembly, a second drive assembly, and an optical element, wherein
   the frame body comprises a first frame portion and a second frame portion;
   the base surrounds the frame body;
   the first drive assembly is disposed between the base and the first frame portion, wherein the first frame portion oscillates relative to the base through the first drive assembly;
   the second drive assembly is disposed between the base and the second frame portion, wherein the second frame portion oscillates relative to the base through the second drive assembly; and
   the optical element is disposed on the frame body and is located in the second frame portion, wherein
   when the actuator is set to a first mode, a phase difference between the first drive assembly and the second drive assembly is substantially 0 degrees, and the frame body takes a diagonal of the optical element as a rotation axis, such that the optical element exhibits a first actuation mode relative to the base, or
   when the actuator is set to a second mode, the phase difference between the first drive assembly and the second drive assembly is substantially 90 degrees, and the frame body takes two center lines of the optical element as rotation axes, such that the optical element exhibits a second actuation mode relative to the base.

2. The actuator according to claim 1, wherein the frame body further comprises at least one first axial portion, at least one second axial portion, and at least one fixing portion, and the at least one fixing portion is fixed on the base, wherein the first frame portion is connected to the at least one fixing portion through the at least one first axial portion, and the second frame portion is connected to the first frame portion through the at least one second axial portion.

3. The actuator according to claim 1, wherein the first drive assembly and the second drive assembly each comprise a voice coil motor or a piezoelectric material.

4. The actuator according to claim 3, wherein the voice coil motor comprises a coil and a magnet, one of the coil and the magnet is fixed on the frame body, and the other of the coil and the magnet is fixed on the base.

5. The actuator according to claim 1, wherein the first actuation mode is a diagonal oscillation, and the second actuation mode is an orthogonal oscillation.

6. The actuator according to claim 1, further comprising a third drive assembly and a fourth drive assembly, wherein
   the third drive assembly is disposed corresponding to the first drive assembly and is disposed between the base and the first frame portion, wherein the first frame portion oscillates relative to the base through the first drive assembly and the third drive assembly; and
   the fourth drive assembly is disposed corresponding to the second drive assembly and is disposed between the base and the second frame portion, wherein the second frame portion oscillates relative to the base through the second drive assembly and the fourth drive assembly.

7. The actuator according to claim 6, wherein a phase difference between the first drive assembly and the third drive assembly is substantially 180 degrees, and a phase difference between the second drive assembly and the fourth drive assembly is substantially 180 degrees.

8. The actuator according to claim 6, wherein when a phase difference between the third drive assembly and the fourth drive assembly is substantially 0 degrees, and a phase difference between the first drive assembly and the fourth drive assembly is substantially 180 degrees, the frame body takes the diagonal of the optical element as the rotation axis, such that the optical element exhibits the first actuation mode relative to the base, and when the phase difference between the third drive assembly and the fourth drive assembly is substantially 90 degrees, and the phase difference between the first drive assembly and the fourth drive assembly is substantially 270 degrees, the frame body takes the two center lines of the optical element as the rotation axes, such that the optical element exhibits the second actuation mode relative to the base.

9. A control method of an actuator, comprising:

receiving, by a user interface, a first mode signal or a second mode signal; and when the user interface receives the first mode signal, controlling, by a control circuit, a phase difference between adjacent two of a plurality of drive assemblies of the actuator to be substantially 0 degrees, such that an optical element exhibits a first actuation mode; or when the user interface receives the second mode signal, controlling, by the control circuit, the phase difference between adjacent two of the plurality of drive assemblies of the actuator to be substantially 90 degrees, such that the optical element exhibits a second actuation mode.

10. The control method according to claim 9, wherein the plurality of drive assemblies comprise a first drive assembly, a second drive assembly, a third drive assembly, and a fourth drive assembly, the third drive assembly and the first drive assembly are opposite to each other, the second drive assembly and the fourth drive assembly are opposite to each other, and the control method of the actuator further comprises:

when the user interface receives the first mode signal, controlling, by the control circuit, a phase difference between the first drive assembly and the third drive assembly to be substantially 180 degrees, a phase difference between the second drive assembly and the fourth drive assembly to be substantially 180 degrees, a phase difference between the third drive assembly and the fourth drive assembly to be substantially 0 degrees, and a phase difference between the first drive assembly and the fourth drive assembly to be substantially 180 degrees, such that the optical element exhibits the first actuation mode;

or when the user interface receives the second mode signal, controlling, by the control circuit, the phase difference between the third drive assembly and the fourth drive assembly to be substantially 90 degrees, and the phase difference between the first drive assembly and the fourth drive assembly to be substantially 270 degrees, such that the optical element exhibits the second actuation mode.

11. The control method according to claim 9, wherein the first actuation mode is a diagonal oscillation, and the second actuation mode is an orthogonal oscillation.

12. A projector, comprising an illumination system, a light valve, a projection lens, and an actuator, wherein the illumination system is configured to provide an illumination light beam;

the light valve is configured to convert the illumination light beam into an image light beam;

the projection lens is configured to project the image light beam out of the projector; and the actuator is disposed between the light valve and the projection lens, and comprises a frame body, a base, a first drive assembly, a second drive assembly, and an optical element, wherein the frame body comprises a first frame portion and a second frame portion;

the base surrounds the frame body;

the first drive assembly is disposed between the base and the first frame portion, wherein the first frame portion oscillates relative to the base through the first drive assembly;

the second drive assembly is disposed between the base and the second frame portion, wherein the second frame portion oscillates relative to the base through the second drive assembly; and the optical element is disposed on the frame body and is located in the second frame portion, wherein when the actuator is set to the first mode, a phase difference between the first drive assembly and the second drive assembly is substantially 0 degrees, and the frame body takes a diagonal of the optical element as a rotation axis, such that the optical element exhibits a first actuation mode relative to the base, or when the actuator is set to the second mode, the phase difference between the first drive assembly and the second drive assembly is substantially 90 degrees, and the frame body takes two center lines of the optical element as rotation axes, such that the optical element exhibits a second actuation mode relative to the base.

* * * * *